June 10, 1930.　　G. A. HOLMES　　1,763,521
FASTENER
Filed Jan. 16, 1929
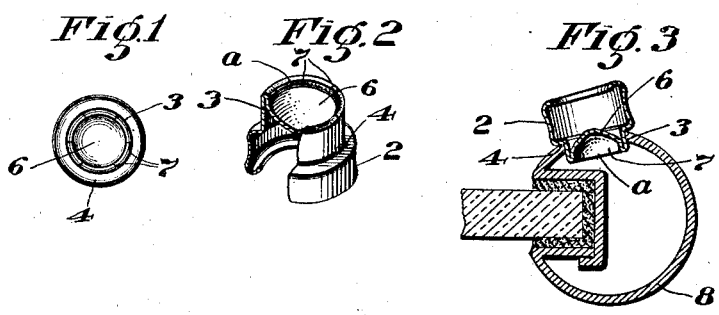
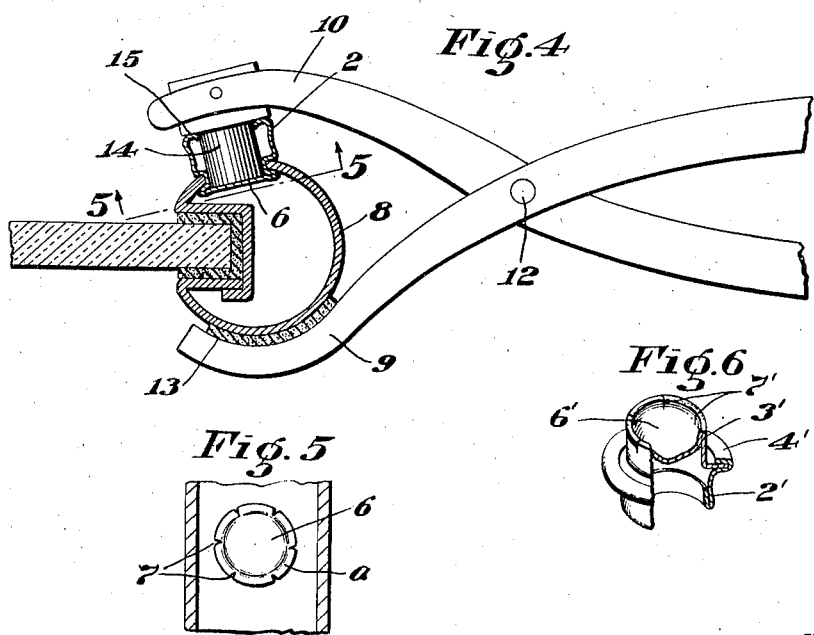
INVENTOR:
George A. Holmes,
BY
his ATTORNEY.

Patented June 10, 1930

1,763,521

UNITED STATES PATENT OFFICE

GEORGE A. HOLMES, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

FASTENER

Application filed January 16, 1929. Serial No. 332,955.

This invention relates to fasteners and will be herein disclosed as embodied in a stud for a snap fastener.

In a pending application I have shown and described a snap fastener stud which can be anchored in the work while operating solely from the front or outer face of the work. This is a very substantial advantage in setting fasteners in many locations where it is impossible to obtain access to the rear side of the wall or surface in which the fastener is to be anchored.

The present invention aims to improve and perfect fastening devices of this general character with a view to producing a more uniform and reliable anchoring of the fastener and reducing the expense of manufacturing such devices.

The nature of the invention will be readily understood from the following description when read in connection with the accompanying drawings, and the novel features will be particularly pointed out in the appended claims.

In the drawings,

Figure 1 is a bottom view of a snap fastener stud embodying this invention;

Fig. 2 is a perspective view, partly in section, of the stud shown in Fig. 1;

Fig. 3 is a sectional view through a portion of a wind shield frame with the stud shown in Figs. 1 and 2 located in an aperture in the frame preparatory to being set or anchored in this position;

Fig. 4 is a view similar to Fig. 3 but showing the fastener after the setting operation has been performed, and illustrating also a tool which may conveniently be used in performing this operation;

Fig. 5 is a sectional view on the line 5—5, Fig. 4; and

Fig. 6 is a perspective view, partly in section, illustrating another embodiment of the invention.

The fastener shown in Figs. 1, 2 and 3 comprises a hollow sheet metal head 2 of a tubular form common in snap fasteners. Extending from the lower side of this head is a tubular shank 3 of approximately cylindrical shape, and a shoulder or base 4 is formed at the junction of the shank and head. The shank is designed to project through a hole formed in some portion of the work to which the fastener is to be secured and ordinarily fits fairly snugly in such a hole while the shoulder or base 4 rests on the outer surface of the work. Closing the lower end of the shank is an inwardly bulged bottom 6 which preferably includes a rim portion $a$ of approximately cylindrical form and a central tapered portion having approximately the shape of a short or relatively flat cone. The rim part $a$ lies immediately inside the lower end portion of the shank 3, parallel to it, and preferably in contact with the inner wall of the shank. A series of cuts 7 are made in the metal of both the rim $a$ and the lower end of the shank 3, and these cuts are located at points spaced around the circumference of the rim and shank and extend longitudinally of the shank, preferably for substantially the entire height of the rim.

This particular fastener is made of a single piece of sheet metal so that all of its parts are integral with each other, and such a construction is preferred because of considerations of economy in manufacture. The method of making the device will be obvious to those skilled in this art. Usually the cuts 7 are made in the blank at an early stage in the process of manufacture, although they can be formed when the shaping operations have been substantially completed.

In securing a fastener of this construction in the work the lower end of the shank is expanded by inserting a tool of some kind through the hollow head 2 and pressing or driving this tool inwardly against the bottom 6. It will be clear from an inspection of Fig. 3 that if a plunger is placed against the apex of the tapered bottom 6 and is pressed forcibly downwardly against this part of the fastener, the force so applied will be transmitted through the tapered walls of the bottom 6, lengthwise of said walls, to the upper edge of the rim $a$. If sufficient force is applied to flatten the bulged portion of the bottom, this part of the fastener will act as a toggle serving to expand the rim a and the lower end of the shank 3. Such an expansion obviously stretches the metal in the latter parts and the cutting of the metal at the points 7 facilitates this stretching action and permits the rim a and the lower end of the shank 3 to expand uniformly and thus to anchor the fastener securely in the work. The result of such expansion is clearly shown in Figs. 4 and 5.

In securing these fasteners in a tubular wind shield frame, such as that indicated at 8, the setting operation can be conveniently performed with the aid of a hand tool of the construction shown in Fig. 4. This tool comprises two jaws 9 and 10 pivoted together at 12, the jaw 9 carrying a pad 13 of yielding material to bear against one side of the tubular frame piece 8, while the other jaw 10 has a plunger 14 pivoted to it and adapted to fit loosely inside the fastener. When the jaws of this tool are forced toward each other the lower end of the plunger 14 bears against the inwardly bulged bottom 6 of the fastener and flattens it, thus expanding the lower end of the shank and anchoring the fastener securely in the work. It should be noted that the flattening action of the conical portion of the bottom 6 is transmitted to that portion of the shank 3 opposite to the upper edge of the rim a so that the shank is enlarged or expanded firmly against the lower part of the aperture in which it is located and against the inner surface of the wall through which the shank projects. The setting movement imparted to the plunger may be limited by forming a shoulder 15 on the plunger 14 at such a distance from the end of the plunger that the shoulder will engage the upper end of the fastener when the inner end of the plunger has completed its expanding and setting stroke.

Fig. 6 shows a construction essentially like that above described except that the head 2' and shank 3' of the fastener are made in separate pieces, the shank having an outturned flange about which the lower margin of the head is crimped. In other respects the two constructions are alike.

The invention thus provides a fastener construction in which the setting operation is performed by working from the front or outer face of the work and inside the fastener itself, access to the rear surface of the wall in which the fastener is set being entirely unnecessary. The cutting of the lower end of the shank, as indicated at 7, facilitates the expansion of this part of the fastener and makes such expansion substantially uniform, very positive and entirely reliable. The peculiar shape of the inwardly bulged bottom and its relationship to the lower end of the shank also contribute to this result.

While I have herein shown and described preferred embodiments of the invention, it will be understood that the invention may be embodied in other forms without departing from the spirit or scope thereof.

Having thus described my invention, what I desire to claim as new is:

1. A fastener member formed from a single piece of metal and comprising a head, a neck, a shoulder and a tubular shank of approximately cylindrical form, said shoulder extending directly inwardly from said neck and connected to said shank, said shank being adapted to be expanded from inside the member to anchor said member in an article of work, and an inwardly bulged bottom for said shank, said bottom including an approximately cylindrical rim portion joined to the lower end of the shank and a central tapered portion, said rim portion lying immediately beside said shank and the metal of said rim and the adjacent part of the shank being cut at points spaced circumferentially around the lower edges of the shank and rim.

2. A fastener member formed from a single piece of metal and comprising a tubular head, a neck, a shoulder and a tubular shank of approximately cylindrical form, said shoulder extending directly inwardly from said neck and connected to said shank, said shank being adapted to be expanded from inside the member to anchor said member in an article of work, and an inwardly bulged bottom for said shank, integral with the shank, and including an approximately cylindrical rim portion lying immediately beside the shank and a central tapered portion, the metal of said rim and the adjacent part of said shank being cut at points spaced circumferentially around the lower edges of said shank and rim.

3. A separable fastener member formed from a single piece of metal and comprising a socket-receiving portion provided with an apertured head, a neck, a base extending directly inwardly from said neck, a cup-shaped attaching portion integral with said base at the inner edge thereof and having a continuous peripheral wall and a hump provided in the bottom of said cup shaped attaching portion prior to attachment of the fastener member to a support, said hump extending toward the aperture in said head and being adapted when pressed axially of the fastener member to laterally expand the continuous wall for securing the fastener member to a support.

4. A separable fastener member formed from a single piece of metal and comprising a tubular socket receiving portion provided with an apertured head, a neck, a base extending directly inwardly from said neck, a cup shaped attaching portion integral with said base and being of smaller diameter than said tubular socket receiving portion and having a peripheral wall and a hump provided in the bottom of said cup shaped attaching portion prior to attachment of the fastener member to a support, said hump extending toward the aperture in said head and being adapted when pressed axially of the fastener member to laterally expand the peripheral wall of the cup shaped attaching portion for securing the fastener member to a support.

5. A separable snap fastener stud member formed from a single piece of metal and comprising a socket receiving portion of substantial length provided with an apertured head, a neck and a base extending inwardly from said neck, a cup shaped attaching portion integral with and extending from the inner edge of said base in a direction away from said socket receiving portion, said cup shaped portion having a peripheral wall, a hump provided in the bottom of said cup shaped portion prior to attachment of the stud member to a support and said cup shaped portion having a series of slits in the peripheral wall to weaken the same and permit lateral expansion thereof to secure the stud member to a support when the hump is flattened by an instrument inserted through the aperture in the said head.

GEORGE A. HOLMES.